J. SMITH.
BATTERY PACKAGE.
APPLICATION FILED MAY 1, 1916.

1,214,836.

Patented Feb. 6, 1917.

Inventor
John Smith,
By his Attorneys
Edwards, Sager & Wooster.

UNITED STATES PATENT OFFICE.

JOHN SMITH, OF BROOKLYN, NEW YORK, ASSIGNOR, BY MESNE ASSIGNMENTS, TO HI-PO WATERPROOF BATTERY CORPORATION, A CORPORATION OF NEW YORK.

BATTERY-PACKAGE.

1,214,836.  Specification of Letters Patent.  Patented Feb. 6, 1917.

Application filed May 1, 1916. Serial No. 94,525.

*To all whom it may concern:*

Be it known that I, JOHN SMITH, a citizen of the United States, residing at Brooklyn, in the county of Kings and State of New York, have invented certain new and useful Improvements in Battery-Packages, of which the following is a full, clear, and exact specification.

This invention relates to a dry cell battery package, and has for its object to provide a combined dry cell set and container which will be both waterproof and heat insulating. Further objects of the invention are to provide a combined dry cell set and package ready to be hung upon a support, and to cheapen the cost of the entire article.

While various forms of waterproof dry cell sets have heretofore been proposed, including sealed cases of both wood and metal, such devices have been objectionable in practice for one reason or another, and have been so expensive as to be unable to compete with loose cells, although a strong demand has existed for waterproof sets which could be sold as cheaply as an equal number of separate cells. In making up waterproof cell sets of varying number of cells according to this invention, it has been found that much longer life is obtained from the cells if they are insulated against sudden changes in temperature, and greater efficiency is obtained from dry cells if they are placed near the device which is to be supplied with current, such as a bell, signal, ignition device, etc. In practically every situation where a cell set as herein described is required to be used, it is preferable to hang the cell set rather than to support it on a special shelf or plate, but individual cells as now commonly used are not adapted for being hung, and consequently are often put at a considerable distance from the device to be operated, thereby necessitating considerable loss of current owing to the line resistance. It has also been found that the output of a dry cell varies widely with the temperature, and sudden changes in temperature are especially harmful, and reduce the total life of the cell.

By this invention, cells are provided in sealed heat insulated and suspensible packages at a price practically the same as an equal number of loose cells, but having a much greater efficiency and much longer life.

The invention with reference to one form thereof is shown in the accompanying drawing, wherein—

In making up the combined dry cell set and package of this invention, the ordinary process in making individual dry cells is departed from, so as to effect a saving both in the amount of zinc required for a given capacity and also in the cost of other materials entering into the complete battery. For example, ordinary single cells are composed of an external zinc cup, which contains the saturated absorbent lining and the depolarizer, the zinc bottom acting as the base of the container, but not being of any value in increasing the capacity of the cell. The zinc cup then has to be protected externally by a wrapping, and the cell as thus completed may or may not be inclosed in the waterproof wood or metal containers above referred to. By this invention, the zinc bottom is done away with and is replaced by a waterproof heat insulating bottom, and no special external covering for the zinc is required to complete the cell, because this function is performed by the waterproof heat insulating casing itself of this invention. The zinc therefore consists of a simple cylinder which is practically wholly available, thereby saving zinc with a minimum of waste. This is an important item inasmuch as the life of a dry cell is to a considerable extent proportional to the amount of available zinc. By this invention the zinc heretofore wasted in the bottom can be used in the sides, without increase in cost, but with much gain in the life of the battery.

Figures 1, 2:
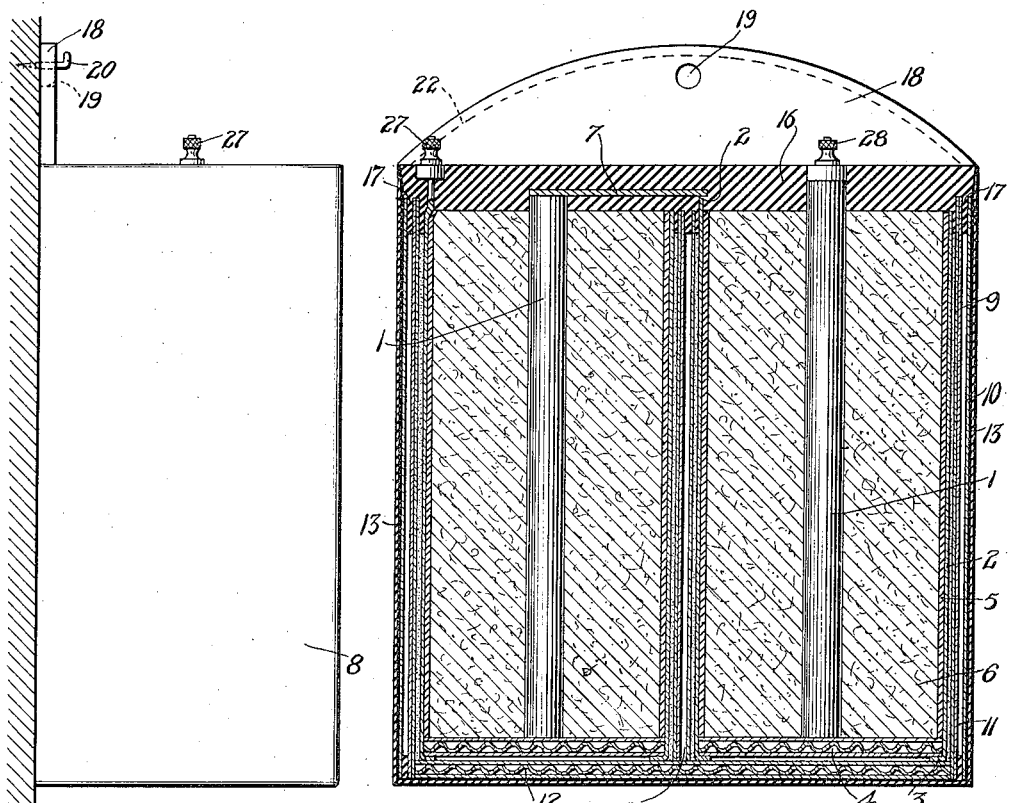
Figure 1 is a cross-section of a two cell package embodying the invention.
Fig. 2 is a side elevation.
Figure 3:
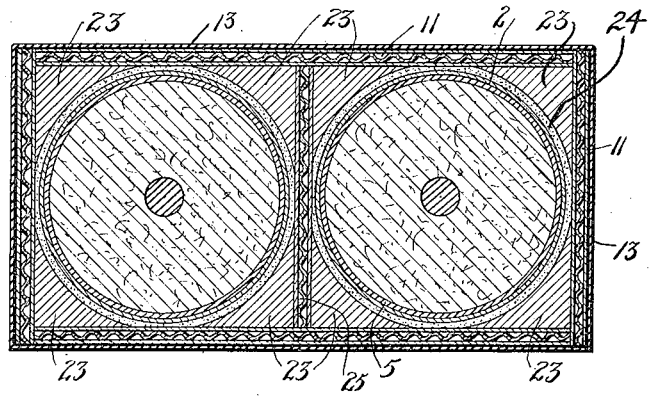
Fig. 3 is a horizontal cross-section.

Each set is made up of as many cells as are desired, permanently connected in series or otherwise within the casing, leaving only the end terminals exposed. Each cell is composed of a negative electrode 1, such as a carbon rod, contained within a positive electrode 2, such as a zinc cylinder, inturned at the bottom, as at 3, so as to retain the cellular water and acid proof non-metallic bottom 4, such as impregnated cardboard or asbestos. 5 is a lining of absorbent material, such as blotting paper, moistened with the electrolyte and 6 is the usual depolarizer filling the remaining space. The bottom 4 is in the form of a disk, which may be made of two separated layers of paper or other suitable material separated by a corrugated board, thereby forming closed air cells in the bottom of the cup. Between the positive element of one cell and the negative element of the next is a permanent series connection 7, which is preferably soldered at one end to the negative element 1 in one cell and at the other end to the positive element 2 in the next cell, as many of these series connections being used as there are cells to be connected in series. Where there are a number of cells, these permanent connections can be in series, parallel, or series parallel as may be desired. The external casing 8 is composed of separated layers 9, 10, such as paper, asbestos, or other suitable material, and an intervening corrugated material 11, such as paper, asbestos, or other suitable material, thereby forming air cells. The corrugations of the casing sides preferably run vertically and the bottom 12 is composed of similar material, the sides and bottom being attached by suitable adhesive strips, or otherwise. The container is made waterproof by being either in part or wholly saturated or painted, or both, with a waterproof insulating compound 13. The top of the cell is sealed by a sealing compound 16 which is poured therein and also into the tops of the vertical corrugations of the casing 8, as shown at 17, so as to seal each of the corrugations and thereby form closed vertical cells. The lower ends of these vertical cells are sealed by the bottom 12. One of the sides 8 is extended upwardly, as at 18, and provided with a hole 19 so as to permit the battery to be hung, as for example on a hook 20. This extension 18 will ordinarily have the air cells extending vertically to its upper edge, and these cells will be closed by the sealing compound as shown by the dotted line 22 in Fig. 1 in the same manner as the side air cells are sealed at 17 by the sealing composition 16. The space between the cells and below the sealing composition 16 is filled up in the usual manner with sand or other non-conducting material 24. Filler blocks, as 23, of waterproof wood are preferably used in order to save weight and also to act as stiffeners for the corners of the casing. These filler blocks can contact on their inner sides with the outside of the sheet metal positive electrode 2 and outside with the corners of the casing. 25 is a separator plate interposed between the positive electrodes 2 of adjacent cells and this is also constructed so as to provide closed air cells. When the battery has been assembled in the casing and sealed, a completely waterproof cellular package is provided, leaving only the external positive and negative terminals 27, 28, exposed.

A battery package constructed as herein described has many advantages over battery packages previously proposed, in that the maximum amount of zinc is available for generating the current, and also because the battery package of this invention can be built at a price to compete with single cells without diminishing the amount of zinc. Moreover, it has been found that batteries constructed according to this invention give more uniform service, owing to being protected by the air cell construction of the casing and bottom from moisture and sudden changes of temperature. By embodying in the casing as built provision for hanging the battery near the article to be controlled there is less loss of current in line resistance, and the battery is not liable to be damaged to the same extent as where it is placed on a shelf with various other articles. While a waterproof cellular casing composed of paper has been specifically described herein as a preferred form, owing to its lightness and cheapness, it is to be understood that other materials may be employed, and various detail changes made, without departing from the scope of the appended claims.

Having thus described my invention, I declare that what I claim as new and desire to secure by Letters Patent, is:—

1. A dry cell battery package comprising positive and negative elements, an electrolyte, a depolarizer, and a cellular sealed waterproof casing inclosing said elements.

2. A dry cell battery package comprising a plurality of cylindrical positive elements, a negative element within each positive element, intermediate connections between said elements, and a cellular sealed waterproof casing inclosing said elements having a top of sealing compound inclosing the intermediate connections.

3. A dry cell sealed battery package comprising positive and negative elements, an electrolyte, a depolarizer, a cellular waterproof casing inclosing said elements, a sealed top closing the cellular sides, one of said sides being provided with a hanging extension.

4. A dry cell battery package comprising a zinc cylinder having a non-metallic bottom, a carbon element within said zinc cylinder, a waterproof cellular sealed casing inclosing said elements, and a waterproof sealing compound covering said elements and closing the cells of said casing.

In testimony whereof I affix my signature, in presence of two witnesses.

JOHN SMITH.

Witnesses:
H. UTARD,
ERNEST J. EBBERS.